(12) United States Patent
Shatil et al.

(10) Patent No.: US 10,812,362 B2
(45) Date of Patent: Oct. 20, 2020

(54) CLIENT DEVICE AND METHOD FOR ANALYSIS OF A PREDETERMINED SET OF PARAMETERS ASSOCIATED WITH RADIO COUPLING TO A WLAN

(71) Applicant: SYMBOL TECHNOLOGIES, LLC, Lincolnshire, IL (US)

(72) Inventors: Ohad Shatil, Dunwoody, GA (US); Subramani Rajendiran, Bangalore (IN)

(73) Assignee: Symbol Technologies, LLC, Holtsville, NY (US)

( * ) Notice: Subject to any disclaimer, the term of this patent is extended or adjusted under 35 U.S.C. 154(b) by 360 days.

(21) Appl. No.: 15/593,558

(22) Filed: May 12, 2017

(65) Prior Publication Data

US 2017/0353374 A1   Dec. 7, 2017

Related U.S. Application Data

(60) Provisional application No. 62/346,016, filed on Jun. 6, 2016.

(51) Int. Cl.
*H04L 12/26* (2006.01)
*H04W 24/02* (2009.01)
(Continued)

(52) U.S. Cl.
CPC .......... *H04L 43/18* (2013.01); *H04L 12/4625* (2013.01); *H04L 43/0811* (2013.01); *H04L 43/10* (2013.01); *H04L 43/50* (2013.01); *H04W 24/02* (2013.01); *H04W 24/08* (2013.01); *H04L 43/08* (2013.01); *H04W 24/06* (2013.01); *H04W 84/12* (2013.01); *H04W 88/02* (2013.01)

(58) Field of Classification Search
None
See application file for complete search history.

(56) References Cited

U.S. PATENT DOCUMENTS 7,313,613 B1    12/2007  Brooking et al.
8,600,726 B1 *  12/2013  Varshney ................ H04L 69/18
                                                                  703/26

(Continued)

OTHER PUBLICATIONS

International Search Report and Written Opinion for International Patent Application No. PCT/US2017/032368 dated Aug. 2, 2017.

*Primary Examiner* — Noel R Beharry
*Assistant Examiner* — Pamit Kaur

(57) ABSTRACT

A client device and method for analysis of a predetermined set of parameters associated with a radio coupling to a WLAN is provided. The client device includes a memory and a radio coupled to at least one processor. The at least one processor executes in the memory a first client Wireless Local Area Network (WLAN) stack having a plurality of layers configured to couple the radio to a WLAN. The at least one processor also executes in the memory a second client WLAN stack emulating the plurality of layers of the first client WLAN stack. The at least one processor is configured to receive, at the second client WLAN stack, data from the plurality of layers of the first client WLAN stack and analyze a predetermined set of WLAN parameters of the client device based on the data received from the plurality of layers of the first client WLAN stack.

20 Claims, 5 Drawing Sheets

(51) Int. Cl.
  *H04L 12/46*   (2006.01)
  *H04W 24/08*   (2009.01)
  *H04W 24/06*   (2009.01)
  *H04W 88/02*   (2009.01)
  *H04W 84/12*   (2009.01)

(56) References Cited

U.S. PATENT DOCUMENTS

| | | | |
|---|---|---|---|
| 2005/0138114 A1* | 6/2005 | Connor | H04L 29/06 |
| | | | 709/203 |
| 2010/0246416 A1 | 9/2010 | Sinha et al. | |
| 2014/0280901 A1* | 9/2014 | Balachandran | H04W 24/04 |
| | | | 709/224 |
| 2016/0182310 A1* | 6/2016 | Gintis | H04L 43/0811 |
| | | | 370/248 |
| 2018/0146390 A1* | 5/2018 | Kim | H04W 24/02 |

* cited by examiner

CLIENT DEVICE AND METHOD FOR ANALYSIS OF A PREDETERMINED SET OF PARAMETERS ASSOCIATED WITH RADIO COUPLING TO A WLAN

CROSS-REFERENCE TO RELATED APPLICATIONS

The present specification claims benefit of priority from U.S. Provisional Patent Application No. 62/346,016 filed Jun. 6, 2016, which is incorporated herein by reference in its entirety.

BACKGROUND

Existing techniques to determine WLAN connectivity and reachability for client devices (such as mobile devices) can be roughly classified into four categories.

The first category is Generic Connectivity Analysis of client devices by serving network entities. Such serving network entities can include local infrastructure devices (such as a serving access point (AP)/switches/routers, and the like), and/or IP (internet protocol) network devices (including local or remote network devices, such as DHCP (Dynamic Host Protocol) Servers, Application Servers, and the like). In such analysis, serving network entities focus on the generic states of the device connection and on its reachability. If an APs' WLAN information about a client device is available, then it would also bring in the WLAN and Radio Frequency (RF) characteristics of the connection. However, these methods cannot "see" the internal states and/or data of a client device and hence neither do these methods consider how client devices facilitate their side of a connectivity protocol.

The second category is Specific WLAN Connectivity Analysis by non-serving-network entities. Such non-serving-network entities include different types of WLAN sniffer modules (such as separate sniffing adapters attached to a laptop (e.g. wildpackets, wireshark, and the like)), client devices which sniff the air promiscuously, and/or non-serving-radios/sensors of a mounted AP. However, these methods can provide only partial reasoning about a client device's facilitation of a WLAN protocol. Additionally, in most cases of packet analysis of upper-networking-layers (e.g. Internet Protocol, Applications) over the WLAN connection, the analysis is limited as the upper protocols/signaling traffic is protected/encrypted end-to-end.

The third category is Connectivity Analysis based on a client device's operating-system "events" (and/or applications using them). In such analysis, data available for analysis from the lower-layers of the networking protocols is very limited because it cannot be customized to specifics of a hardware platform performing the analysis. Hence, data being analyzed would be post-results and/or post-transition of the protocols, and excluding data reflecting decisions on how to facilitate them and the reasons for selected sub-elements for packet exchanges with an AP.

The fourth category is Debugging Software which often cannot be productized due to security reasons. Analysis of WLAN connectivity using such software can be performed using ongoing 'raw' debugging data from internal low-layers of a client device. Besides security concerns of debugging code in final products, such debugging software produces large amounts of data which necessitates large processing times and/or special expertise to decode it.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
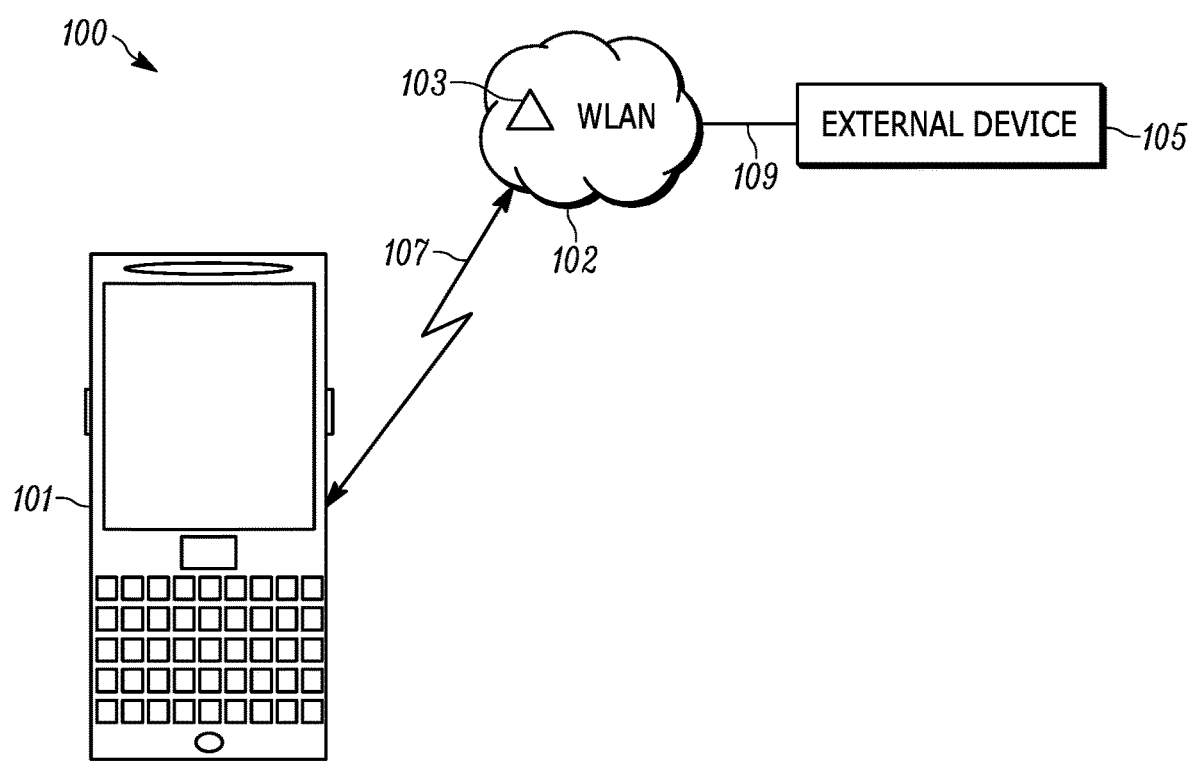
FIG. 1 is a schematic of a system that includes a client device in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

The present specification provides a client device and method for analysis of a predetermined set of parameters associated with radio coupling to a WLAN, including, but not limited to, connectivity, link quality, and network reachability of a radio, of the client device, over a WLAN. Client devices and methods described herein analyze such coupling using an emulator that executes a client connectivity stack (e.g. internal networking layers) that emulates a plurality of layers of a client connectivity stack that is performing the real-time coupling of the radio to the WLAN. The emulator can be located on the same client device that is coupling to the WLAN. Hence, data from individual sub-layers of the internal networking layers is received and used by the emulator to provide output that allows an analyzer to provide real-time analysis of the coupling.

An aspect of the specification provides a client device comprising: a memory; a radio coupled to at least one processor, the at least one processor executing in the memory a first client Wireless Local Area Network (WLAN) stack having a plurality of layers configured to couple the radio to a WLAN; and a second client WLAN stack, executed by the at least one processor in the memory, emulating the plurality of layers of the first client WLAN stack, wherein the at least one processor is configured to receive, at the second client WLAN stack, data from the plurality of layers of the first client WLAN stack and analyze a predetermined set of WLAN parameters of the client device based on the data received from the plurality of layers of the first client WLAN stack.

In some embodiments, the processor is further configured to report an output of the predetermined set of WLAN parameters to an external device.

In some embodiments, the predetermined set of WLAN parameters comprises one or more of: connectivity, link quality, and network reachability of the radio over the WLAN.

In some embodiments, the data received from the first client WLAN stack comprises one or more of: unencrypted packets transmitted to the WLAN and received from the WLAN; event data associated with one or more of the plurality of layers; configuration data; and network scan data.

In some embodiments, the at least one processor is further configured to: determine, based on execution of the second client WLAN stack, that execution of one or more processes of the first client WLAN stack is blocked, change configuration data associated with the first client WLAN stack to unblock the execution of the one or more processes, and re-execute the first client WLAN stack to execute the one or more processes based on changed configuration data.

In some embodiments, the at least one processor is further configured to analyze the predetermined set of WLAN parameters associated with the radio coupling to the WLAN based on execution of the second client WLAN stack emulating the plurality of layers of the first client WLAN stack by: first determining whether one or more of network scan data and network connectivity data indicate that a connection of the radio to the WLAN is occurring; when the connection of the radio to the WLAN is occurring: continue analyzing the predetermined set of WLAN parameters to determine a connectivity state of the radio; and when the connection of the radio to the WLAN is not occurring: stop analyzing the predetermined set of WLAN parameters.

In some embodiments, the at least one processor is further configured to analyze the predetermined set of WLAN parameters associated with the radio coupling to the WLAN based on execution of the second client WLAN stack emulating the plurality of layers of the first client WLAN stack by: determining that a connection between the radio and the WLAN is completed; and, thereafter, determining one or more of link quality and network reachability.

In some embodiments, the predetermined set of WLAN parameters includes one or more of link quality and network reachability, and the at least one processor is further configured to analyze one or more of the link quality and the network reachability by: controlling the radio to transmit one or more packets to determine one or more of the link quality and the network reachability.

A further aspect of the specification provides a method comprising: at a client device comprising: a memory and a radio coupled to at least one processor, executing a first client Wireless Local Area Network (WLAN) stack having a plurality of layers configured to couple the radio to a WLAN; executing a second client WLAN stack, emulating the plurality of layers of the first client WLAN stack; receiving, at the second client WLAN stack, data from the plurality of layers of the first client WLAN stack; and analyzing a predetermined set of WLAN parameters of the client device based on the data received from the plurality of layers of the first client WLAN stack.

In some embodiments, the method further comprises reporting an output of the predetermined set of WLAN parameters to an external device.

In some embodiments, the predetermined set of WLAN parameters comprises one or more of: connectivity, link quality, and network reachability of the radio over the WLAN.

In some embodiments, the data received from the first client WLAN stack comprises one or more of: unencrypted packets transmitted to the WLAN and received from the WLAN; event data associated with one or more of the plurality of layers; configuration data; and network scan data.

In some embodiments, the method further comprises: determining, based on execution of the second client WLAN stack, that execution of one or more processes of the first client WLAN stack is blocked; changing configuration data associated with the first client WLAN stack to unblock the execution of the one or more processes; and re-executing the first client WLAN stack to execute the one or more processes based on changed configuration data.

In some embodiments, the method further comprises analyzing the predetermined set of WLAN parameters of the client device based on the data received from the plurality of layers of the first client WLAN stack by: first determining whether one or more of network scan data and network connectivity data indicate that a connection of the radio to the WLAN is occurring; when the connection of the radio to the WLAN is occurring: continue analyzing the predetermined set of WLAN parameters to determine a connectivity state of the radio; and when the connection of the radio to the WLAN is not occurring: stop analyzing the predetermined set of WLAN parameters.

In some embodiments, the method further comprises analyzing the predetermined set of WLAN parameters of the client device based on the data received from the plurality of layers of the first client WLAN stack by: determining that a connection between the radio and the WLAN is completed; and, thereafter, determining one or more of link quality and network reachability.

In some embodiments, the predetermined set of WLAN parameters includes one or more of link quality and network reachability, and the method further comprises analyzing one or more of the link quality and the network reachability by: controlling the radio to transmit one or more packets to determine one or more of the link quality and the network reachability.

Yet a further aspect of the specification provides a non-transitory computer-readable medium storing a computer program, wherein execution of the computer program is for: at a client device comprising: a memory and a radio coupled to at least one processor, executing a first client Wireless Local Area Network (WLAN) stack having a plurality of layers configured to couple the radio to a WLAN; executing a second client WLAN stack, emulating the plurality of layers of the first client WLAN stack; receiving, at the second client WLAN stack, data from the plurality of layers of the first client WLAN stack; and analyzing a predetermined set of WLAN parameters of the client device based on the data received from the plurality of layers of the first client WLAN stack.

In some embodiments, execution of the computer program is further for: reporting an output of the predetermined set of WLAN parameters to an external device.

In some embodiments, execution of the computer program is further for: determining, based on execution of the second client WLAN stack, that execution of one or more processes of the first client WLAN stack is blocked; changing configuration data associated with the first client WLAN stack to unblock the execution of the one or more processes;

and re-executing the first client WLAN stack to execute the one or more processes based on changed configuration data.

In some embodiments, execution of the computer program is further for analyzing the predetermined set of WLAN parameters of the client device based on the data received from the plurality of layers of the first client WLAN stack by: first determining whether one or more of network scan data and network connectivity data indicate that a connection of the radio to the WLAN is occurring; when the connection of the radio to the WLAN is occurring: continue analyzing the predetermined set of WLAN parameters to determine a connectivity state of the radio; and when the connection of the radio to the WLAN is not occurring: stop analyzing the predetermined set of WLAN parameters.

Attention is directed to FIG. 1 which depicts a system 100 comprising a client device 101 in communication with a wireless local area network (WLAN) 102 that, as depicted, includes an access point 103. As depicted, the system 100 further includes an external device 105 which, for example, manages and/or configures components of the WLAN 102 including, but not limited to, the access point 103. The client device 101 is interchangeably referred to hereafter as the device 101, and the external device 105, is interchangeably referred to hereafter as the device 105. When the device 101, which is interchangeably referred to hereafter as device 101, is in communication with the WLAN 102, a wireless communication link 107 is established between the device 101 and the WLAN 102. Similarly, the device 105 is in communication with components of the WLAN 102 including, but not limited to, the access point 103, via a link 109, which is wireless and/or wired as desired. The device 105 is referred to as an external device indicating that the device 105 is external to device 101. Devices 101, 105 configured to communicate using links 107, 109.

The device 105 is referred to as an "external" device indicating that the device 105 is external to device 101. The device 105 generally comprises an external servers and/or PC (personal computer) with respective plugins for display and analytics (not depicted) including, but not limited to, analytics for analyzing output from the device 101 in order to better manage and/or control the WLAN 102. As such, the device 105 includes, but is not limited to, a network analysis computing device associated with one or more of customer IT entities, support entities, field-engineers, $3^{rd}$-party deployments, professional-services entities, onsite and/or offsite debugging environments, customer labs, readiness-testing in production environments, monitoring/debugging environments, and the like.

As will be described below, the device 101 includes components specifically configuring the device 101 for analysis of a predetermined set of parameters associated with radio coupling to a WLAN, including, but not limited to, the WLAN 102. The output from such analysis is, in some embodiments, provided to the device 105 for management and/or control of the WLAN 102 and the device 101.

Figure 2:
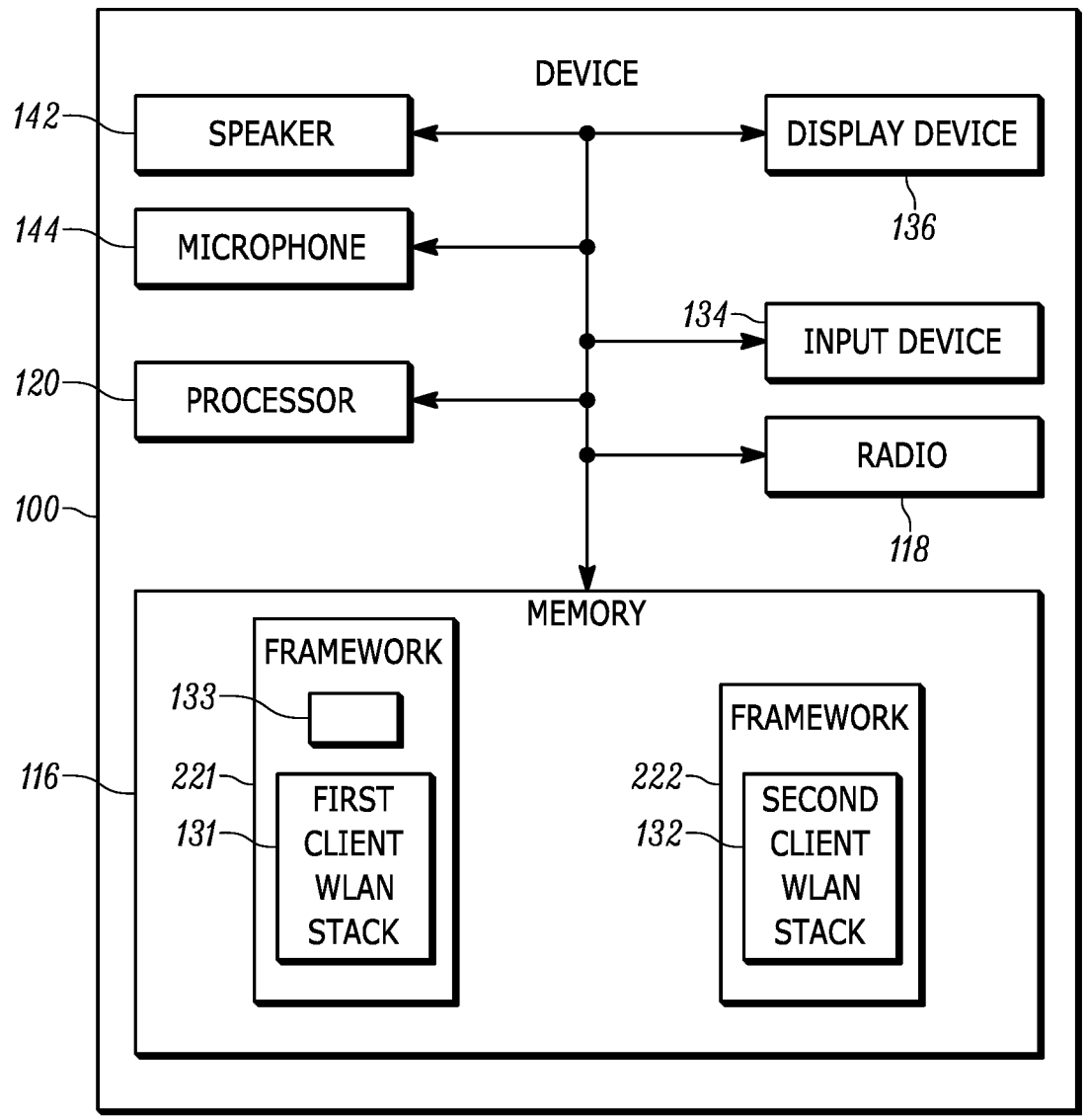
FIG. 2 is a schematic block diagram of certain internal hardware components of the client device of FIG. 1.

Attention is next directed to FIG. 2 which depicts a schematic diagram of the device 101. In particular, the device 101 comprises: a memory 116; a radio 118 coupled to at least one processor 120, the at least one processor 120 executing in the memory 116 a first client Wireless Local Area Network (WLAN) stack 131 having a plurality of layers (described below) configured to couple the radio 118 to a WLAN (e.g. the WLAN 102); and a second client WLAN stack 132, executed by the at least one processor 120 in the memory 116, emulating the plurality of layers of the first client WLAN stack 131, wherein the at least one processor 120 is configured to receive, at the second client WLAN stack 132, data from the plurality of layers of the first client WLAN stack 131 and analyze a predetermined set of WLAN parameters of the client device 101 based on the data received from the plurality of layers of the first client WLAN stack 131. The predetermined set of WLAN parameters is described below in further detail below.

As depicted, the device 101 further comprises configuration data 133, stored in the memory 116, and some processes of the first client WLAN stack 131 generally operate according to the configuration data 133.

As depicted, the device 101 further comprises an input device 134, a display device 136, a speaker 142, and a microphone 144.

As further depicted, the device 101 is specifically configured to include a WLAN computer framework 221, which includes at least the first client WLAN stack 131, the framework 221 being executed in the memory 116 by the at least one processor 120; and a WLAN computer framework 222, which includes at least the second client WLAN stack 132, the framework 222 also being executed in the memory 116 by the at least one processor 120. In general, the framework 221 includes components and/or functionality of the device 101 that manages communication with the WLAN 102 using the radio 118; for example, the framework 221 includes, but is not limited to, the first client WLAN stack 131, as well as components and/or functionality for managing the configuration data 133, managing and/or monitoring packet transmission and reception using the radio 118, performing network scans, and the like. Such components can include, but are not limited to, a DHCP (Dynamic Host Configuration Protocol), an ARP (Address Resolution Protocol) client, and the like.

The framework 222 includes components and/or functionality of the device 101 for analyzing a predetermined set of WLAN parameters of the client device based on the data received from the plurality of layers of the first client WLAN stack 131.

As depicted, the device 101 is a mobile device with telephonic functionality. However, the device 101 need not comprise a mobile communication device, but rather, in other embodiments, comprises a computing device further specifically adapted for specialized functionality. For example, in some embodiments, the device 101 is a component of a kiosk which communicates with the WLAN 102.

In some embodiments, the device 101 is specifically adapted for warehouse inventory tracking and/or other data acquisition functionality using a data capture component, and the like; in some of these embodiments, the device 101 further includes other types of hardware for warehouse inventory tracking and/or other data acquisition functionality, including, but not limited to, one or more of a radio frequency identification (RFID) reader, a Near Field Communication (NFC) reader, and/or other types of data acquisition components. In yet further embodiments, the device 101 is mountable in a vehicle.

Other computing devices that communicate with a WLAN using a radio are within the scope of the present specification including, but not limited to printers, networked devices, appliances configured with internet-of-things protocols, devices that are addressable in a WLAN and/or which are assigned a network address and/or served by components of a WLAN.

The example at least one processor 120 of FIG. 2 includes one or more logic circuits specifically configured to, for example, implement network management functionality of the device 101. Example logic circuits include one or more processors, one or more microprocessors, one or more ASIC (application-specific integrated circuits) and one or more FPGA (field-programmable gate arrays). In some examples, the device 101 is specifically configured to implement specific WLAN communication analysis functionality. For example, in some embodiments, the device 101 and/or the at least one processor 120 specifically comprises a computer executable engine configured to implement WLAN communication analysis described herein.

Furthermore, while only the one processor 120 is depicted, in other embodiments, the device 101 comprises multiple processors 120, for example, a first processor executing the framework 221 and a second processor executing the framework 222.

The memory 116 of FIG. 2 is a machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random access memory ("RAM")). In the example of FIG. 2, programming instructions (e.g., machine readable instructions) that implement the functional teachings of the device 101 as described herein are maintained, persistently, at the memory 116 and used by the at least one processor 120 which makes appropriate utilization of volatile storage during the execution of such programming instructions.

The example memory 116 of FIG. 2 stores the framework 221, including the first client WLAN stack 131, and the framework 222, including the second client WLAN stack 132, that, when executed by the at least one processor 120, enables the at least one processor 120 to implement WLAN analysis functionality. In the illustrated example, when the at least one processor 120 executes, in the memory 116, the frameworks 221, 222, the at least one processor 120 is configured to: execute the first client WLAN stack 131 having a plurality of layers configured to couple the radio to a WLAN; execute the second client WLAN stack 132, emulating the plurality of layers of the first client WLAN stack 131; receive, at the second client WLAN stack 132, data from the plurality of layers of the first client WLAN stack 131; and analyze a predetermined set of WLAN parameters of the client device 101 based on the data received from the plurality of layers of the first client WLAN stack 131.

The example radio 118 of FIG. 2 generally comprises one or more radio circuit components configured for communication with the WLAN 102 including, but not limited the access point 103 according to, for example, one or more 802.11 WLAN protocols including, but not limited to, WiFi protocols, and the like. Hence, the link 107 comprises a WLAN link including, but not limited to, a WiFi link, and the like.

While not depicted, in some embodiments, the device 101 further includes one or more further radios and/or connectors and/or network adaptors, configured to communicate wired and/or wirelessly with network architecture that is used to implement one or more communication links between other devices and/or other networks. Example communication links include one or more of USB (universal serial bus) cables, serial cables, wireless links, cell-phone links, cellular network links (including but not limited to 2G, 2.5G, 3G, 4G+ such as UMTS (Universal Mobile Telecommunications System), GSM (Global System for Mobile Communications), CDMA (Code division multiple access), FDD (frequency division duplexing), LTE (Long Term Evolution), TDD (time division duplexing), TDD-LTE (TDD-Long Term Evolution), TD-SCDMA (Time Division Synchronous Code Division Multiple Access) and the like), wireless data, packet based links, WiMax links, the Internet, analog networks, the PSTN (public switched telephone network), access points, and the like, and/or a combination.

The example input device 134 of FIG. 2, includes, but is not limited to, a keyboard, a touch screen of the display device 136, a touch pad, one or more buttons, one or more actuators, and the like. The example display device 136 of FIG. 2 comprises any suitable one of, or combination of, flat panel displays (e.g. LCD (liquid crystal display), plasma displays, OLED (organic light emitting diode) displays) and the like, as well as one or more optional touch screens (including capacitive touchscreens and/or resistive touchscreens. The example speaker 142 and microphone 144 of FIG. 2 include any combination of speakers and microphones which enable telephonic communication, and the like, of the device 101 using, for example, the radio 118 and the WLAN 102. The device 101, in other embodiments, any other hardware and/or components for specialized operation of the device 101. For example, when the device 101 is a component of a kiosk or a vehicle, the device 101 includes specialized components associated with kiosks or vehicles.

The various hardware components of the device 101 are interconnected, for example via one or more communication buses. The device 101 also includes a power source (not shown) for supplying the above-mentioned components with electrical power. In the present example, the power source includes a battery; in other examples, the power source includes a wired connection to a wall outlet or other external power source in addition to or instead of the battery.

Figure 3:
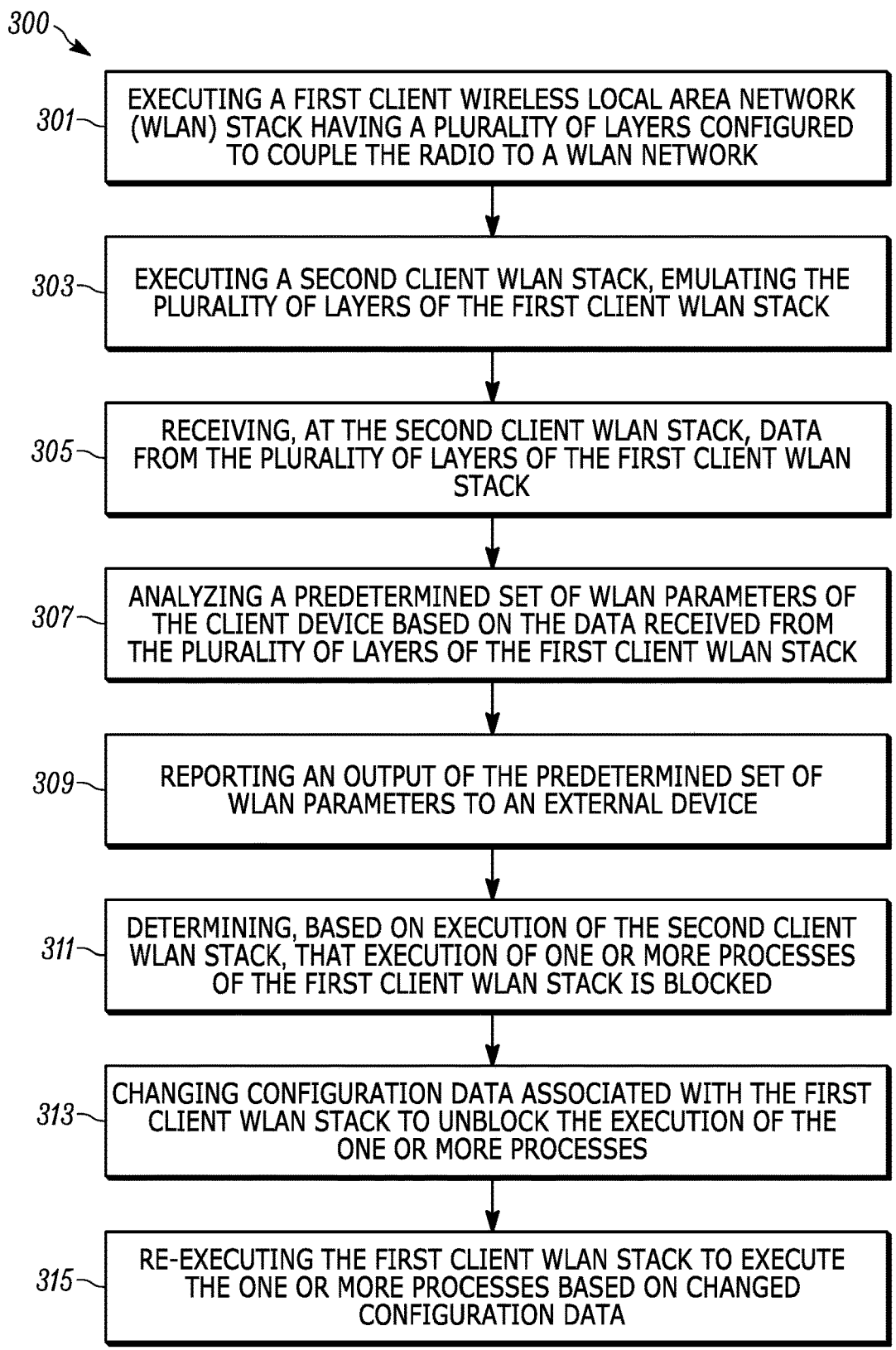
FIG. 3 is a flowchart of a method for analysis of a predetermined set of parameters associated with radio coupling to a WLAN in accordance with some embodiments.

Attention is now directed to FIG. 3 which depicts a flowchart representative of an example method 300 for WLAN analysis functionality of the example device 101. The example operations of the method 300 of FIG. 3 correspond to machine readable instructions that are executed by, for example, the device 101 of FIG. 2, and specifically by the at least one processor 120 executing the frameworks 221, 222. Indeed, the example method 300 of FIG. 3 is one way in which the device 101 is configured. However, the following discussion of the example method 300 of FIG. 3 will lead to a further understanding of the device 101, and its various components. However, it is to be understood that in other embodiments, the device 101 and/or the method 300 are varied, and hence need not work exactly as discussed herein in conjunction with each other, and that such variations are within the scope of present embodiments.

Furthermore, the example method 300 of FIG. 3 need not be performed in the exact sequence as shown and likewise, in other embodiments, various blocks may be performed in parallel rather than in sequence. Accordingly, the elements of method 300 are referred to herein as "blocks" rather than "steps." The example method 300 of FIG. 3 may be implemented on variations of the example device 101, as well.

At block 301, the at least one processor 120 is executing the first client WLAN stack 131 having a plurality of layers configured to couple the radio 118 to a WLAN (e.g. WLAN 102).

At block 303, the at least one processor 120 is executing the second client WLAN stack 132, emulating the plurality of layers of the first client WLAN stack 131;

At block 305, the at least one processor 120 is receiving, at the second client WLAN stack 132, data from the plurality of layers of the first client WLAN stack 131.

At block 307, the at least one processor 120 is analyzing a predetermined set of WLAN parameters of the client device 101 based on the data received from the plurality of layers of the first client WLAN stack 131.

In embodiments described herein, the blocks 303, 303, 305, 307 generally operate in parallel with each other such that as the at least one processor 120 is executing the first client WLAN stack 131, the at least one processor 120 is also executing the second client WLAN stack 132, for example based on the data received from the plurality of layers of the first client WLAN stack 131, and analyzing the predetermined set of WLAN parameters.

At block 309, the at least one processor 120 is reporting an output of the predetermined set of WLAN parameters to the external device 105, for example based on the analysis of the block 307. However, in some embodiments, the block 309 is optional. Alternatively, and/or in addition to the block 309, the at least one processor 120 records the output in the memory 116. Furthermore, in some embodiments, the block 309 is executing in parallel at least with the block 307 such that the output is reported to the external device 105 as the output is generated, for example as each layer in the second client WLAN stack 132 is executed.

At block 311, the at least one processor 120 is determining, based on execution of the second client WLAN stack 132, that execution of one or more processes of the first client WLAN stack 131 is blocked. At block 313, the at least one processor 120 is changing configuration data 133 associated with the first client WLAN stack 131 to unblock the execution of the one or more processes. At block 315, the at least one processor 120 is re-executing the first client WLAN stack 131 to execute the one or more processes based on changed configuration data. Blocks 311, 313, and 315 generally operate in parallel with each of remaining blocks 301, 303, 305, 307, 309 of the method 300 and, hence when the method 300 is interrupted and/or stops due to, blocking of one or more processes of the first client WLAN stack 131, execution of the blocks 311, 313, 315 are used to unblock the one or more processes of the first client WLAN stack 131.

Blocks 311, 313, 315 are optional in other embodiments.

Figure 4:
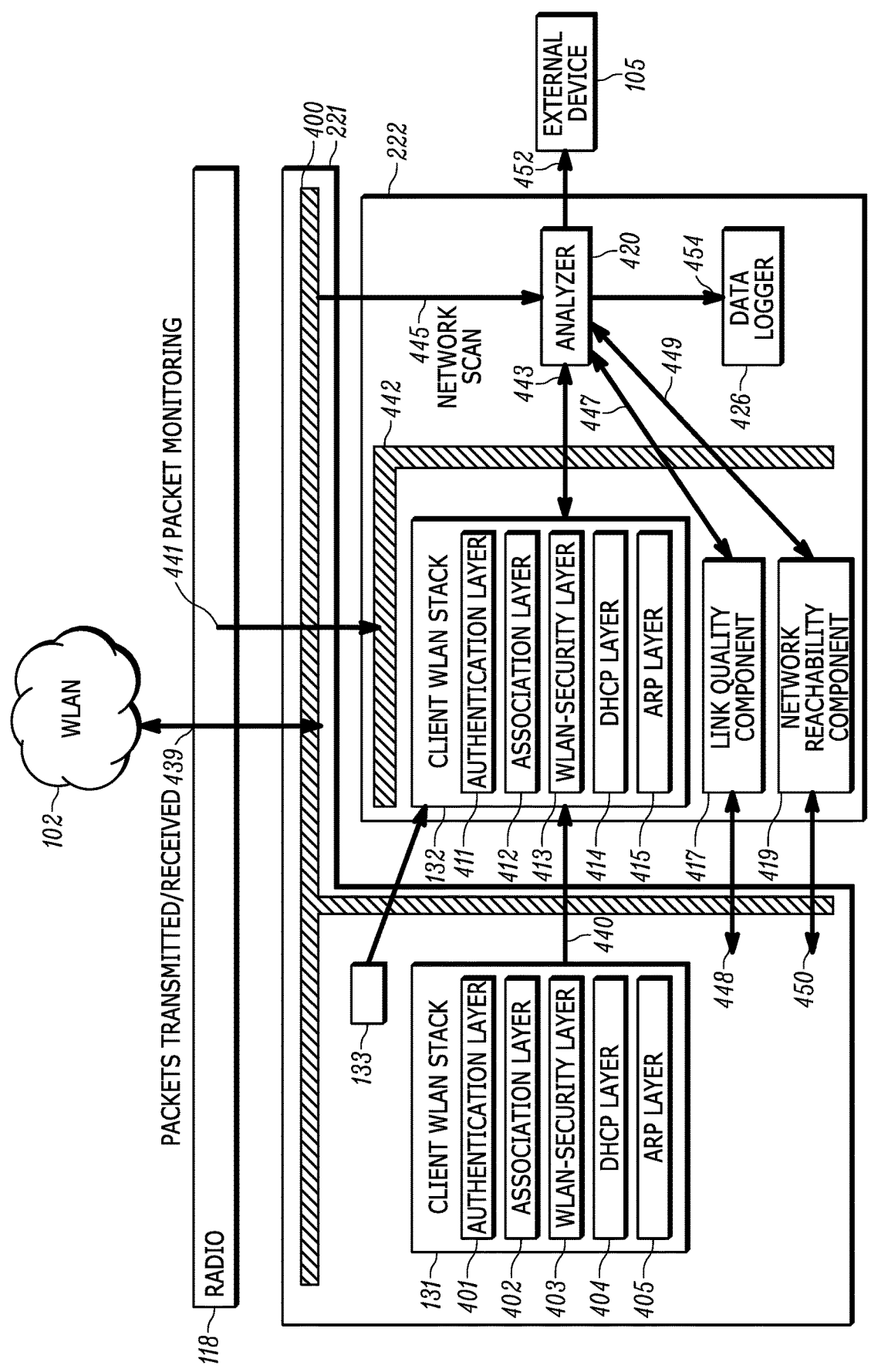
FIG. 4 is a block diagram of certain internal components of the client device of FIG. 1.
Figure 5:
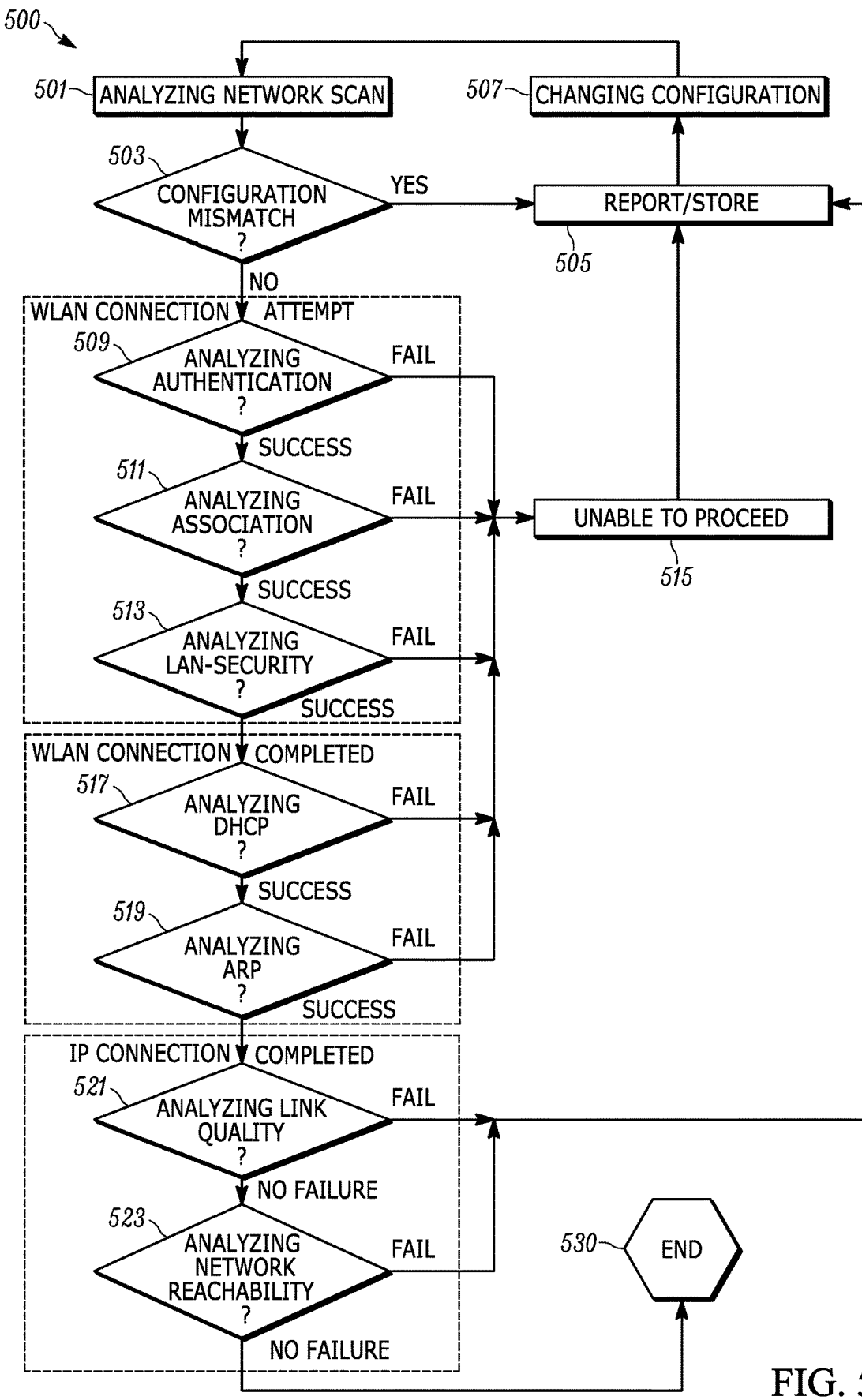
FIG. 5 is a flowchart of a method for analysis of a predetermined set of parameters associated with radio coupling to a WLAN in accordance with some embodiments.

The method 300 is described hereafter with reference to FIG. 4 and FIG. 5. FIG. 4 depicts detail and operation of the frameworks 221, 222 as the device 101 communicates with the WLAN 102 using the radio 118, as the at least one processor 120 is implementing the method 300. FIG. 5 depicts a method 500 which depicts a particular embodiment of aspects of method 300, specifically by the at least one processor 120 executing the framework 222. Indeed, the following discussion of FIG. 4 and FIG. 5 will lead to a further understanding of the method 300.

With reference to FIG. 4, the framework 221 comprises the first client WLAN stack 131 and an optional WLAN driver interface 400. The WLAN driver interface 400 monitors interactions between the radio 118 and components of the framework 221. Indeed, in some embodiments, data is conveyed between the radio 118 and components of the framework 221 using the WLAN driver interface 400. Furthermore, the WLAN driver interface 400 monitors interactions between the framework 221 and the framework 222. Indeed, in some embodiments, data is conveyed between the framework 221 and the framework 222. However, in some embodiments, the functionality of WLAN driver interface 400 is a component of at least the framework 221 (and optionally the framework 222), and the WLAN driver interface 400 is not a distinct component. Either way, the device 101 is configured to monitor interactions between the radio 118 and components of the framework 221, and further configured to monitor interactions between the framework 221 and the framework 222.

The first client WLAN stack 131 comprises a plurality of layers that include, in the depicted example embodiment: an authentication layer 401, an association layer 402, a WLAN-security layer 403, a DHCP (Dynamic Host Configuration Protocol) layer 404 (which can be part of a DHCP client) and an ARP (Address Resolution Protocol) layer 405 (which can be part of an ARP client). The layers 401-405 comprises at least a subset of network stack and/or network layers (e.g. including but not limited to layers of an Open Systems Interconnection (OSI) model and the like, and/or layers of any other suitable networking model and/or networking stack). For example, as the radio 118 is establishing communications with WLAN 102, each layer 401-405 is executed (e.g. in the block 301 of the method 300), and each header of packets 439 transmitted and/or received with the WLAN 102 using the radio 118, during execution of each of the layer 401-405, include an identifier a corresponding layer 401-405. When present the WLAN driver interface 400, monitors the packets 439.

While only five layers are depicted, in other embodiments, the first client WLAN stack 131 comprises more than five layers. In yet further embodiments, the first client WLAN stack 131 comprises fewer than five layers.

Indeed, execution of the first client WLAN stack 131 is generally dependent on hardware and/or components used to communicate with the WLAN 102 and/or the hardware and/or components of the WLAN 102. For example, the radio 118 and/or the WLAN 102 are configured to communicate according to data rates, frame rates etc. that depend on the radio 118 and/or the AP 103, and the execution of the first client WLAN stack 131 is configured accordingly.

The framework 221 further includes the configuration data 133 which can include data for communicating with the WLAN 102 during execution of the first client WLAN stack 131 including, but not limited to, one or more passwords (e.g. a password for the AP 103), a communication data rate (e.g. used with the AP 103), a communication frame rate (e.g. used with the AP 103), and the like.

The framework 222 comprises the second client WLAN stack 132, which comprises a plurality of layers that include, in the depicted example embodiment: an authentication layer 411, an association layer 412, a WLAN-security layer 413, a DHCP layer 414 and an ARP 415. Each of the layers 411-415 hence corresponds to a similar layer of the first client WLAN stack 131. Indeed, each of the layers 411-415 is generally the same as a corresponding layer 401-405 such that the second client WLAN stack 132 emulates the first client WLAN stack 131. In particular, a number of layers in the second client WLAN stack 132 is the same as a number of layers in the first client WLAN stack 131.

As depicted, the framework 222 further comprises: a link quality component 417, a network reachability component 419, an analyzer 420 and a data logger 426.

Furthermore, while the link quality component 417, the network reachability component 419, the analyzer 420 and the data logger 426 are depicted as separate components of the framework 222, in other embodiments, one or more of the link quality component 417, the network reachability component 419, the analyzer 420 and the data logger 426 are combined into a single component; for example, the data logger 426 can be incorporated into the analyzer 420.

To emulate the first client WLAN stack 131, the second client WLAN stack 132 receives configuration data 133 from the framework 221, as well as event data 440 from the plurality of layers 401-405 of the first client WLAN stack 131. The event data 440 is monitored by the WLAN driver interface 400, when present. For example, as the at least one processor 120 is executing each layer 401-405 of the first client WLAN stack 131, the event data 440 indicating events occurring at each layer 401-405 is received at the second client WLAN stack 132, and the second client WLAN stack 132 correspondingly emulates the first client WLAN stack 131. In particular, each of the plurality of layers 401-405 is executed in a sequence, and the event data 440 is hence also received in a sequence. In other words, while the event data 440 is depicted in FIG. 4 as a single arrow, the event data 440 comprises a plurality of sets of data, for example, a set for each of the layer 401-405, received at the second client WLAN stack 132 as each of the corresponding layers 401-405 is executed.

Furthermore, as the framework 221 exchanges packets 439 with the WLAN 102, copies of the packets 441 are received at the framework 222, for example in a packet monitoring process as implemented, for example, using a sniffer module 442 of the framework 222. The sniffer module 442 is configured to hold and/or cache copies of the packets 441, which may obviate packet storing from occurring at the framework 221 reducing memory usage and use of timing resources of the framework 221. The sniffing module 442 hence may provide a resource, and/or a single resource, for the components of the second client WLAN stack 132 (as well as the link quality component 417 and the network reachability component 419) for that have been exchanged between the framework 221 and the WLAN 102. Hence, the sniffing module 442 may comprise a cache storing unencrypted copies of the packets 441 which is accessible to other components of the framework 222. Such a packet monitoring process using the sniffing module 442 is hence similar to packet sniffing, and the like, that occurs external to the device 101; however, in contrast to packet sniffing, the copies of the packets 441 are not encrypted and/or are provided to the framework 222 using the sniffing module 442 prior to encryption, if any. The example copies of the packets 441, as depicted, hence comprise open (e.g. unencrypted) packets including, but not limited to, unencrypted packets transmitted to the WLAN 102 and received from the WLAN 102. The unencrypted packets can comprise raw packets from the first client WLAN stack 131, and specifically raw packets from layers in the first client WLAN stack 131 where the networking traffic is in its IEEE 802.11 packet format.

As such, the second client WLAN stack 132 mirrors and/or emulates the first client WLAN stack 131. For example, execution of the second client WLAN stack 132 doesn't result in transmission or receipt of packets, receipt of same and/or similar data used by and/or received by and/or transmitted by the first client WLAN stack 131 (e.g. the copies of the packets 441 as cached by the sniffer module 442, the second client WLAN stack 132, as well as the configuration data 133 and the event data 440) enables the second client WLAN stack 132 to mirror and/or emulate the first client WLAN stack 131.

In contrast to the first client WLAN stack 131, the second client WLAN stack 132 is not hardware dependent as the second client WLAN stack 132 is being executed on the basis of received data. As such, in some embodiments, the second client WLAN stack 132 is implemented as a state machine at the device 101 which mirrors and/or emulates the connectivity, and the like of the first client WLAN stack 131.

The analyzer 420 generally exchanges data 443 with the second client WLAN stack 132 (e.g. requests data and receives data) to determine whether there are problems and/or issue with each layer 411-415 of the second client WLAN stack 132; furthermore, as the second client WLAN stack 132 is emulating the first client WLAN stack 131, when the analyzer finds problems and/or issues at the second client WLAN stack 132, it is assumed that the same problems and/or issues have occurred at the first client WLAN stack 131, as described below with respect to FIG. 5.

As depicted, the analyzer 420 further receives, from the framework 221, network scan data 445 indicative of a network scan and/or network survey, for example to determine whether a configuration of network connectivity and/or the radio 118 matches an expected connectivity, for example using the configuration data 133. Such a network scan can occur prior to the first client WLAN stack 131 being used to communicate with the WLAN 102, automatically and/or when requested by the analyzer 420. Indeed, in some embodiments, a network scan is initiated by the framework 221, for example prior to the first client WLAN stack 131 being executed, the network scan data 445 is acquired, and provided to the framework 222, without initiation by the framework 222 and/or as part of a network connectivity process of the framework 221. For example, prior to connecting to a network such as the WLAN 102, the client device 101 performs a network scan to find networks with which to connect.

As depicted, the analyzer 420 further exchanges data 447 with the link quality component 417, for example to analyze a quality of the link 107 when established (e.g. by executing the first client WLAN stack 131). The link quality component 417 generally causes the link quality to be analyzed by exchanging data 448 with the framework 221 (as monitored by the WLAN driver interface 400, when present) which in turn causes packets to be transmitted using the radio 118 to test the quality of the link 107, for example by injecting packets into transmissions of the radio 118 using the link 107, and measuring a response, if any. The packet monitoring of the copies of the packets 441 that result from such transmission, as cached by the sniffer module 442, is used by the analyzer 420 to determine the link quality.

Similarly, the analyzer 420 further exchanges data 449 with the network reachability component 419, for example to analyze a reachability of the WLAN 102 (e.g. reachability of WLAN components in the WLAN 102 beyond the AP 103). The network reachability component 419 generally causes the network reachability to be analyzed by exchanging data 450 with the framework 221 (as monitored by the WLAN driver interface 400, when present) which in turn causes packets to be transmitted using the radio 118 to test the reachability of the WLAN 102, for example by injecting packets into transmissions using the link 107, and measuring a response, if any, from the WLAN 102. The packet monitoring of the copies of the packets 441 that result from such transmission, as cached by the sniffer module 442, is used by the analyzer 420 to determine the reachability of the WLAN 102.

The analyzer 420 is further configured to report output 452 the external device 105 and/or to provide output 454 to the data logger 426 which stores the output 454 to the memory 116 for later retrieval and analysis. While the output 452 is depicted as being provided to the external device 105 without the use of the radio 118 and the WLAN 102, the output 452 is, in some embodiments, provided to the external device 105 using the radio 118; however, in other embodiments, the output 452 is provided to the external device 105 using one or more of another radio of the device 101 (e.g. a cellular radio), another wireless link (e.g. not a cellular link), another network (e.g. a cellular network), and/or a wired connection (e.g. a wired connection to the Internet).

Indeed, it is assumed that the external device 105 has registered with the device 101 to receive the output 452 and that any data logging and/or analytics of the external device 105 are compatible with an application programming interface (API) of the analyzer 420.

When it is not possible to provide the output 452 to the external device 105, for example when the device 101 cannot communicate with the external device 105, and when the output 454 is stored at the memory 116, when the device 101 later is in communication with the external device 105, the output 454 is later transmitted to the external device 105 as the output 452. In other words, output 452, 454 are similar to each other.

In general, the analyzer 420 is executed by the at least one processor 120 as part of the framework 222 to analyze a predetermined set of WLAN parameters which includes, but is not limited to, or more of: connectivity, link quality, network reachability of the radio over the WLAN 102, authentication parameters, association parameters, WLAN-security parameters, DHCP parameters, and ARP parameters. Examples of such parameters are provided hereafter:

Authentication parameters, associated with the authentication layers 401, 411, include, but are not limited to: authentication timeout, de-authentication packets and the like.

Association parameters, associated with the association layers 402, 412, include, but are not limited to: association timeouts, disassociation packets (and/or the de-authentication packets) and the like.

WLAN-security parameters, associated with the WLAN-security layers 403, 413, include, but are not limited to: parameters indicative of whether a given and/or expected authentication method and/or protocol has been used, such as WPA2 (Wi-Fi Protected Access 2), WPA (Wi-Fi Protected Access) and WEP (Wired Equivalent Privacy); parameters indicative of whether the device 100 has applied a given and/or expected encryption method and/or protocol, such as CCMP (Counter Mode Cipher Block Chaining Message Authentication Code Protocol), TKIP (Temporal Key Integrity Protocol); and other parameters related to WLAN security.

DHCP parameters, associated with the DHCP layers 404, 414, include, but are not limited to: DHCP timeouts, DHCP NACK packets, and the like.

ARP parameters, associated with the ARP layers 405, 415 include, but are not limited to: ARP timeouts, ARP responses, and the like.

Link quality parameters, associated with the link quality component 417, include, but are not limited to: determinations of one or more quality factors (including combinations thereof) per a given time period, as well as data indicative of rends of such quality factors. Such quality factors include, but are not limited to: RSSI (received signal strength indicator), SNR (Signal-to-Noise Ratio), data rates, number of Layer2 packets transmitted and received, and the like.

Network reachability parameters, associated with the network reachability component 419, include, but are not limited to: ICMP (Internet Control Message Protocol) packets and/or ping packets, data indicative of assessing reachability of a configurable remote destination, and data indicative of statistical measures of the reachability of the configurable remote destination, and the like.

In analyzing the predetermined set of WLAN parameters, the processes that occur in conjunction with the framework 222 generally validate operation of the framework 221. Furthermore, when problems and/or issue are encountered, the device 101, in some configurations, proactively repairs and/or fixes the problems and/or issues, for example by changing the configuration data 133 and re-executing the first client WLAN stack 131.

Indeed, as described herein, the framework 222 has several capabilities, as summarized hereafter.

Capability-A: CLIENT STACK EMULATION

The second client WLAN stack 132 of the framework 222 generally mirrors/emulates the existing first client WLAN stack 131 at the client device 101, including layers relating to IP/DHCP-Client (e.g. DHCP layer 404) and ARP-client functionality (e.g. ARP layer 405). Indeed, the first client WLAN stack 131 generally attempts to provide stable connectivity and reachability with the WLAN 102 (e.g. via the AP 103) which can include farther distributed system network components.

As the second client WLAN stack 132 is located at the device 101, the mirroring/emulation of the first client WLAN stack 131 generally occurs in real-time and/or near real-time. As such, the mirroring/emulation performed at the second client WLAN stack 132 generally captures "subjective" data/states/operations/etc. occurring at the framework 221, including at the first client WLAN stack 131, in real-time and/or near real-time. The term "subjective" as used herein refers to internal data/states/operations etc., of the layers 401-405 of the first client WLAN stack 131.

In addition, as the copies of the packets 441, as cached by the sniffer module 442, are received at the framework 222 in the packet monitoring as raw packets and/or unencrypted packets, the framework 222 also generally captures "objective" data/states/operations/etc. occurring at the framework 221. The term "objective" as used herein refers to external data/states/operations etc., that occur in response to and/or as an outcome of, internal operations of the first client WLAN stack 131 and/or relative to operations of the AP 103.

In addition, as the raw packets are "open" and/or not encrypted, when the packets are received from the WLAN 102, the framework 222 is generally receiving and dissecting IEEE 802.11 packets at a point where they are already decrypted by the first client WLAN stack 131, which removes the operation of the framework 222 from the link 107, and which hence generally protects the link 107 from operation of the framework 222. Similarly, when the packets are being transmitted to the WLAN 102, the framework 222 is generally receiving and dissects 802.11 packets at a point where they are not-yet encrypted by the first client WLAN stack 131, which again removes the operation of the framework 222 from the link 107, and which hence generally protects the link 107 from operation of the framework 222.

Furthermore, when the device 101 is communicating with the AP 103 using a protocol according to IEEE amendment of 802.11w (Management Frames Protection (MFP)), receipt of open packets also occurs when MFP encryption/decryption is occurring; as such, MFP does not affect the analysis described herein.

In general, the raw packets received by the framework 222 are associated with the device 101 (e.g. the raw packets are filtered according to headers that include an address of the device 101, for example, a MAC (media access control) address when the device 101 is operating according to 802.11 address filtering. However, in other embodiments, the device 101 is operated in a raw-sniffer mode such that all detectable packets detectable by the radio 118 are received, not only those associated with the device 101. In these embodiments, not all packets received at the framework 222 are raw and/or open and/or unencrypted, however receipt of such packets can assist the analyzer 420 with determining the success of packet filtering by the framework 221.

In addition, determination of both "subjective" and "objective" states of the device 101 by the analyzer facilitates determination of the interoperability of the client device 101 with the AP 103, and other components of the WLAN 102 (e.g. components of a distributed system network). For example, the states of the raw packets received at the framework 222 provide an indication of states of hardware of the WLAN 102 (e.g. including the AP 103), which can be similar an indication of states determined by external tools being used to analyze the WLAN 102 (e.g. as performed by the external device 105). As such, when the output 452 is provided to the external device 105, the external device 105, in some embodiments, uses the output 452 to confirm analysis of the WLAN 102 performed without the output 452.

Capability-B: DETERMINATION OF PRE-PROVISIONED CONFIGURATION

As the configuration data 133 is received at the framework 222, in some embodiments, the configuration data 133 is incorporated into the output 452 and/or the output 454, such that the configuration data 133 is provided to the external device 105 for analysis. The configuration data 133 generally comprises data used the client device 101 that is related to networking and/or communicating with the WLAN 102 and is pre-provisioned at the client device 101, for example by an entity issuing and/or managing the client device 101. In some embodiments, the configuration data 133 is static, however in other embodiments (e.g. when the blocks 311-315 are executed), the configuration data 133 is changed to unblock the first client WLAN stack 131. The configuration data 133 can include, but is not limited to: configured WLAN radio parameters; configured WLAN connectivity parameters; and, configured DHCP/IP parameters. Hence, the external device 105 is provided with the same parameters to assist in analysis of the WLAN 102.

Capability-C: NETWORK SCAN

The network scan data 445, indicative of a network scan and/or network, in some embodiments, is also incorporated into one or more of the output 452 and the output 454. The analyzer 420, in some embodiments, further dissects the network scan data 445 into granular portions that correspond to each of the plurality of layers 401-405 of the first client WLAN stack 131, such that the network scan data 445 includes authentication data, association data, WLAN-security data, DHCP data and ARP data, assuming such data is in the network scan data 445 when acquired during the network scan.

Capability-D: LINK QUALITY TESTING

In embodiments that include the link quality component 417, the framework 222 is enabled to proactively perform a link quality test for example by injecting packets into transmissions by the radio 118, as indicated by the data 448. In some embodiments, the data 448 includes instructions and/or configuration data for transmitting the injected packets, for example using different data rates and/or frame rates, or any other configurations that affect communication between the radio 118 and the AP 103 and/or the WLAN 102. As such, the framework 222 determines if different configurations of the device 101 lead to more efficient operation of the device 101 and/or the radio 118, as if certain underlying Radio interoperation configuration (impacting interoperation between Client and AP) is better than another. For example, for each tested configuration, the framework 222 measures packet traffic performance (e.g. using the copies of the packets 441, as cached by the sniffer module 442) by measuring one or more of packet loss, packet delays, and jitter. In some embodiments, such measurements related to measuring link quality further include, but are not limited to: running tests for different power-save parameters of the client device 101; running tests for different 11n/11ac Block-Ack parameters of the client device 101; running tests for different bandwidth reservation (e.g. TSpec (Traffic Specification)) parameters and/or for different QoS (Quality of Service) tagging parameters.

However, varying of any data configuration parameters (including, but not limited to, varying parameters of the configuration data 133) in link quality testing is generally temporary, with the output of such testing provided to the external device 105 for analysis of the operation and/or connectivity of the WLAN 102. Once the link quality testing is concluded, the provisioned configuration data 133 is used for further communications with the WLAN 102 (e.g. the configuration data 133 is not changed).

Capability-E: NETWORK REACHABILITY TESTING

In embodiments that include the network reachability component 419, the framework 222 is enabled to proactively perform network reachability testing for example by causing interjecting of packets (e.g. transmitted by the radio 118) related to a proactive networking reachability interaction and/or by passively snooping and evaluate performance of specific traffic between an application at the client device 101 and a networking server associated with the WLAN 102 (which can include, but is not limited to, the external device 105). Packet injection occurs via data 450.

In some embodiments, the framework 222 proactively runs a network reachability test to a remote TCP (Transmission Control Protocol) port and/or a remote UDP (User Datagram Protocol) port, and/or the framework 222 runs a reachability test to a remote server URL (Uniform Resource Locator) and/or an IP address. In these instances, the framework 222 can cause the device 101 (e.g. via data 450) to ping a direct IP destination address, and/or first resolve URL addressing via a DNS (Dynamic Name Services)-Query procedure (and/protocol) and then cause the device 101 to ping that IP destination address. The response to the pinging indicates network reachability.

In yet further embodiments, the framework 222 analyzes (e.g. at the analyzer 420) signaling traffic (e.g. via the copies of the packets 441, as cached by the sniffer module 442) between a voice client (not depicted) at the device 101 and a voice server to test network reachability of the client/server protocol. In these embodiments, the network reachability occurs without injection of additional packets into transmissions by the radio 118.

In yet further embodiments, the framework analyzes (e.g. at the analyzer 420) web server traffic (e.g. packets related to Hypertext Transfer Protocol (HTTP) as received via the copies of the packets 441, as cached by the sniffer module 442) to test network reachability between a web application at the client device 101 and a network server. In these embodiments, the network reachability occurs without injection of additional packets into transmissions by the radio 118.

However, varying of any data configuration parameters (including, but not limited to, varying parameters of the configuration data 133) in network reachability testing is generally temporary, with the output of such testing provided to the external device 105 for analysis of the operation and/or connectivity of the WLAN 102. Once the network reachability testing is concluded, the provisioned configuration data 133 is used for further communications with the WLAN 102 (e.g. the configuration data 133 is not changed).

Capability-F: UNBLOCKING OF FIRST CLIENT WLAN STACK

In embodiments that include the execution of the blocks 311-315 of the method 300, the framework 222 is configured to unblock the first client WLAN stack 131 when the analyzer 420 detects a performance issue at the second client WLAN stack 132, which is generally representative of an actual performance issue of the first client WLAN stack 131; such performance issues include, but are not limited to, blocking where the first client WLAN stack 131 entirely blocked from being able to progress through the processes associated with the layers 401-405. In these embodiments, the framework 222 (e.g. the analyzer 420) proactively accesses and changes the configuration data 133 with different values to change behavior of one or more layers 401-405 of the first client WLAN stack 131 associated with the issue. For example, when the configuration data 133 has been provisioned with a data rate incompatible with the AP 103, the framework 222 causes the data rate stored at the configuration data 133 to be changed, and restarts the first client WLAN stack 131. Indeed, similar to the link quality testing, different data rates are changed and tested, and the data rate stored at the configuration data 133 is changed to a data rate that leads to an unblocking of the first client WLAN stack 131 (e.g. a most efficient communication with the AP 103 and/or a data rate that successfully leads to communication with the AP 103 (e.g. successful establishment of the link 107)). In other embodiments, other parameters stored at the configuration data 133 are changed and tested, and then updated based on a successful unblocking of the first client WLAN stack 131.

However, in contrast to the testing and analysis performed during link quality testing and/or network reachability testing (where changing parameters is temporary), changing of parameters of configuration data 133 for unblocking of the first client WLAN stack 131, changing of the configuration data 133 to unblock of the first client WLAN stack 131 is generally permanent, at least until a next time unblocking of the first client WLAN stack 131 occurs. Further, these embodiments generally assume that the framework 222 has permission to change the configuration data 133 (e.g. the permissions are configurable at the client device 101 is some embodiments).

Capability-G: RECORDING/LOGGING OUTPUT

The framework 222 is generally configured to record and/or log the real-time outputs of each of the plurality of layers 411-415 of the second client WLAN stack 132, for example, by using the data logger 426 to store the output 454, including positive and negative outputs of the analyzer 420. For example, a positive output indicates that a layer 411-415 was successful in performing its function, while a negative output indicates that a layer 411-415 was not successful in performing its function.

When a negative output occurs, the output 454 includes a respective reason-code pertaining to the real-time networking functionality involved (e.g. 802.11, DHCP/IP, ARP). For example, different networking protocols (e.g. 802.11, DHCP/IP, ARP) generally have different reason-codes associated with different states, such as reason-codes for one or more of failures; AP-deauthentication; disassociation; DHCP errors; ARP reachability errors, and the like. Hence, in these embodiments, the analyzer 420 is provisioned with such reason-codes and when a negative output occurs, the associated reason-code is logged at the output 452, 454. Such reason-codes can be integers represented of one or more of global failures and/or specific failures, and can further be granular and/or parsed out to provide details of a given failure.

Capability-H: PROVIDING OUTPUT TO EXTERNAL DEVICE

The framework 222 is generally configured to send all of the real-time outputs to the external device 105 as the output 452, which is generally similar to the output 454, and hence includes reason-codes, and the like, as described above. The external device 105 receives the output 452 and analyzes the output 452. In some embodiments, the external device 105 includes one or more of: a visualization application, an analysis application, an analytics Cloud application, a local device, a remote device, a private domain remote analytics terminal, and the like.

Furthermore, the external device 105, in some embodiments, visually displays the output 452 and/or analysis thereof. Indeed, in further embodiments, the external device 105 receives output from a plurality of client devices, each provisioned with a framework 222, and the external device 105 combines output from each of the client devices to perform multi-device analysis which can be used as part of a prediction-model for WLAN behavior, and the like.

Attention is now directed to FIG. 5 which depicts a flowchart representative of an example method 500 for WLAN analysis functionality of the example device 101. Indeed, the method 500 can comprise a particular embodiment of aspects of the method 300. The example operations of the method 500 of FIG. 5 correspond to machine readable instructions that are executed by, for example, the device 101 of FIG. 2, and specifically by the at least one processor 120 executing the frameworks 221, 222. Indeed, the example method 500 of FIG. 5 is one way in which the device 101 is configured. However, the following discussion of the example method 500 of FIG. 5 will lead to a further understanding of the device 101, and its various components. However, it is to be understood that in other embodiments, the device 101 and/or the method 500 are varied, and hence need not work exactly as discussed herein in conjunction with each other, and that such variations are within the scope of present embodiments.

Furthermore, the example method 500 of FIG. 5 need not be performed in the exact sequence as shown and likewise, in other embodiments, various blocks may be performed in parallel rather than in sequence. Accordingly, the elements of method 500 are referred to herein as "blocks" rather than "steps." The example method 500 of FIG. 5 may be implemented on variations of the example device 101, as well.

It is assumed in the method 500 that the framework 222 is receiving data as described above with respect to FIG. 4, for example the data 440, the copies of the packets 441, as cached by the sniffer module 442 etc. It is further assumed that the client device 101, including layers 401-405 of the first client WLAN stack 131, is in a non-network connected, and that the framework 221 is beginning a network connectivity process that includes the first client WLAN stack 131 being executed in the memory 116 by the at least one processor 120.

At block 501, the at least one processor 120 receives the network scan data 445. At block 503, the at least one processor 120 determines if there is a mismatch in an expected configuration of any networks detected during the network scanning (e.g. WLAN 102), and an actual configuration of any networks detected during the network scanning. For example, in some embodiments, the network scan data 445 includes raw scanning-related 802.11 packets (e.g. 802.11 beacons and probes). From such data, the at least one processor 120 can determine one or more of: whether there is an error (or not) in how the framework 221 is parsing the raw packets into an internal Scanning database; and how "busy" or iterative (e.g. retrying of relevant scanning procedures) the framework 221 is when acquiring the network scan data 445. Indeed, one or more of these determinations are indicative of Radio Frequency (RF) conditions of the radio 118 as patterns and/or iterations of raw scanning packets vary greatly.

Also at block 503, the at least one processor 120 compares the network scan data 445 to the configuration data 133 (e.g. provisioned network connectivity parameters of the client device 101) to determine if there is a match therebetween.

For example, a provisioned network name (e.g. an SSID (Service Set Identifier) stored in the configuration data 133 might not be in the network scan data 445, which could indicate a mis-configuration of an SSID value and/or that a network associated with a provisioned SSID is in range of the radio 118.

Continuing with this example, when an SSID acquired in the network scan data 445 matches an SSID stored in the configuration data 133, the configuration data 133 could indicate that the associated network operates according to a first WLAN-Security cipher method (e.g. TKIP (Temporal Key Integrity Protocol)), however the network scan data 445 acquired at the block 501 could indicate that the associated network operates according to a second WLAN-Security cipher method (e.g. AES (Advanced Encryption Standard)) (e.g. as advertised in packets from a an AP beacon of the network). A mismatch in either parameter leads to a determination at block 503 of a configuration mismatch (e.g. a "Yes" decision), and hence, if execution of the first client WLAN stack 131 were to proceed, blocking would occur. Hence, at block 505, the at least one processor 120 reports the configuration mismatch to the external device 105 using the output 452, and/or stores the configuration mismatch to the memory 116 using the data logger 426, as the output 454. However, one or more of the processes of the block 505 are optional in some embodiments. Furthermore, block 505 represents an embodiment of the block 309 of the method 300.

The block 507 (which can occur before, after and/or in parallel with the block 505), the framework 222 changes the configuration data 133, as described above. Furthermore, block 507 represents an embodiment of the blocks 311-315 of the method 300.

For example, at the block 507, a WLAN-Security cipher method associated erroneously with an SSID is updated to the actual WLAN-Security cipher method associated with the SSID (e.g. the WLAN-Security cipher method is changed from TKIP to AES, assuming the device 101 is configured to apply the updated WLAN-Security cipher method; otherwise, the method 500 ends and/or block 507 does not occur). Presuming block 507 is executed, blocks 501, 503 are re-executed until no configuration mismatch occurs at block 503 (e.g. a "No" decision at block 503), and the at least one processor 120 proceeds to execute blocks 509, 511, 513 to attempt a WLAN connection.

Indeed, the at least one processor 120 proceeds to execute blocks 509, 511, 513 to attempt a WLAN connection whenever a "No" decision occurs at block 503, regardless of whether blocks 505, 507 are executed. Hence, blocks 509, 511, 513 are grouped together using a stippled box in the method 500 as being part of a WLAN Connection Attempt.

Indeed, at each of block 509, 511, 513 it is assumed that layers 411, 412, 413 of the second client WLAN stack 132 are respectively emulating layers 401, 402, 403 of the first client WLAN stack 131, as described above. In other words, at each of block 509, 511, 513 it is assumed that blocks 301-307 of the method 300 are being executed, for example in parallel and/or in conjunction with each other. Indeed, each of blocks 509, 511, 513 represent a more granular indication of at least block 307 of the method 300. Indeed, as described below, at each of the blocks 509, 511, 513 a predetermined set of WLAN parameters (e.g. associated with each of the layers 401, 402, 403) of the client device 101 is analyzed based on the data 440 received from the plurality of layers 401-403 of the first client WLAN stack 131.

Hence, in conjunction with the block 307, it is further assumed that the analyzer 420 is analyzing the emulation of each layer 411, 412, 413 to determine whether a failure occurs. When a failure occurs, it is assumed that similar failure as occurred at a respective layer 401, 402, 403 of the first client WLAN stack 131.

Hence, at the block 509, the at least one processor 120 analyzes the authentication being emulated at the authentication layer 411 (which is assumed to be similar to and/or the same as the authentication occurring at the authentication layer 401). Such analysis includes, but is not limited to determination of whether real-time authentication packets (e.g. received in the copies of the packets 441, as cached by the sniffer module 442), as advertised in beacons and/or probes from the AP 103, are in conformance with relevant configured parameters at the configuration data 133 (e.g. authentication information in an authentication packet is the same as that stored in the configuration data 133). When a failure occurs, for example a failure within an 802.11 authentication protocol, an associated reason-code of 802.11 is determined, as described above.

Assuming, however, that block 509 is successful (e.g. a "Success" determination at block 509), at the block 511, the processor 120 analyzes the association being emulated at the association layer 412 (which is assumed to be similar to and/or the same as the association occurring at the association layer 402).

Such analysis includes, but is not limited to, determination of whether real-time association packets (e.g. received in the copies of the packets 441, as cached by the sniffer module 442), as advertised in beacons and/or probes from the AP 103, are in conformance with relevant configured parameters at the configuration data 133 (e.g. association information in an association packet is the same as that stored in the configuration data 133). When a failure occurs, an associated reason-code is determined, as described above.

Assuming, however, that block 511 is successful (e.g. a "Success" determination at block 511), at the block 513, the processor 120 analyzes the WLAN security being emulated at the WLAN-security layer 413 (which is assumed to be similar to and/or the same as the association occurring at the WLAN-security layer 403).

Such analysis includes, but is not limited to, a determination of whether real-time conformance to WLAN security parameters are occurring at both the device 101 and the AP 103. For example, there could a be password mismatch between the device 101 and the AP 103. Alternatively, analysis of real-time WLAN security packets occurs (e.g. received in the copies of the packets 441, as cached by the sniffer module 442).

In cases of explicit failures of WLAN-Security protocols, failure/rejection/timeout reason is determined, for example in the form of a reason-code as described above.

In an instance of a failure at any of the blocks 509, 511, 513 (e.g. a "Fail" determination at any of block 509, 511, 513), the next block is not executed. Rather, at the block 515, the processor 120 determines that the first client WLAN stack 131 is blocked and/or unable to proceed. In some embodiments, the method 300 then ends, while in other embodiments, the block 505 and/or the block 507 is executed.

When the block 507 is executed to change the configuration data 133 to unblock one or more of blocks 509, 511, 513, the method 300 is re-executed. Furthermore, block 507 can be repeated dynamically when failures occur at two or more of the blocks 509, 511, 513.

Presuming, however, that success occurs at each of the block 509, 511, 513, the at least one processor 120 proceeds to execute each of blocks 517, 519. Such execution assumes that a WLAN connection has been completed and hence blocks 517, 519 are grouped together using a stippled box in the method 500 as occurring under the assumption that a WLAN connection is completed. In other words, success at each of the block 509, 511, 513 assumes that the client device 101 has established a WLAN connection while executing the layers 401, 402, 403 of the first client WLAN stack 131. Hence, it is assumed that the client device 101 has proceeded to execute the DHCP layer 404 and the ARP layer 405 to trigger communications between the client device 101 (e.g. a DHCP-Client and a ARP-Client) corresponding remote distributed System networking entities, including, but not limited to, a DHCP-Server, switches, routers, and the like.

Hence, as described below, at each of the blocks 517, 519 a predetermined set of WLAN parameters (e.g. associated with each of the layers 404, 405) of the client device 101 is analyzed based on the data 440 received from the plurality of layers 404, 405 of the first client WLAN stack 131.

At the block 517, the processor 120 analyzes DHCP processes being emulated at the DHCP layer 414 (which is assumed to be similar to and/or the same as DHCP processes occurring at the DHCP layer 404). Such analysis includes, but is not limited to, determining whether DHCP addressing resolution completed successfully (or not). When a failure occurs, an associated reason-code (and/or failure code) is determined, as described above; alternatively, a timeout is determined.

Assuming, however, that block 517 is successful (e.g. a "Success" determination at block 517), at the block 519, the processor 120 analyzes ARP processes being emulated at the ARP layer 415 (which is assumed to be similar to and/or the same as the ARP processes occurring at the ARP layer 415). Such analysis includes, but is not limited to, determining whether ARP configuration data stored at the configuration data 133 has resulted in the client device 101 successfully communicating with a default Gateway for example, a routing and/or switching device associated with an assigned IP-subnet of the device 101 (e.g. for local ARP Cache purposes).

In an instance of a failure at any of the blocks 517, 519 (e.g. a "Fail" determination at any of block 517, 519), the next block is not executed. Rather, at the block 515, the processor 120 again determines that the first client WLAN stack 131 is blocked and/or unable to proceed and the method 500 proceeds as described above, with DHCP configuration data and/or ARP configuration data being changes at block 509, when executed, to unblock one or more of blocks 517, 519.

Presuming, however, that success occurs at each of the block 517, 519, the at least one processor 120 proceeds to execute each of blocks 521, 523. Such execution assumes that an IP connection has been completed and hence blocks 521, 523 are grouped together using a stippled box in the method 500 as occurring under the assumption that an IP connection is completed. In other words, success at each of the block 517, 519 assumes that the client device 101 has established an IP connection while executing the layers 404, 405 of the first client WLAN stack 131. Hence, it is assumed that the client device 101 has proceeded to communicate with the WLAN 102, for example using one or more of a voice client, a browser application, and the like, and that the first client WLAN stack 131 and/or and other networking components (a DHCP client, an ARP client, and the like) are at a stable state of WLAN and IP addressing. Hence, link quality and/or network reachability are determined at blocks 521, 523.

At the block 521, the at least one processor 120 analyzes link quality, as described above, for example to test different RF parameters and/or other link quality parameters, using the link quality component 417. At the block 523, the at least one processor 120 analyzed network reachability, for example to test reachability to one or more of a remote TCP/UDP port and/or a remote server URL and/or IP address, as described above, using the network reachability component 419.

Hence, according to blocks 521, 523, the predetermined set of WLAN parameters determined by the at least one processor 120 includes one or more of link quality and network reachability, and the at least one processor 120 is further configured to analyze one or more of the link quality and the network reachability by: controlling the radio 118 to transmit one or more packets to determine one or more of the link quality and the network reachability, as described above.

Execution of blocks 521, 523 occur in any order; when a failure occurs (e.g. a "Fail" decision at either of blocks 521, 523), the at least one processor 120 reports and/or logs the failure at the block 505. In some instances, for example, when the failure is catastrophic and/or the networking components of the device 101 are no longer at a stable state of WLAN and IP addressing, the method 500 re-executes. Otherwise the method ends. When no failure occurs at blocks 521, 523 (e.g. a "No Failure" decision at either of blocks 521, 523), the method ends at block 530.

Further comparing the method 500 to the method 300, according to the blocks 501, 503 occurring prior to the blocks 509-513, 517, 519, 521, 523, the at least one processor 120 is configured to analyze predetermined set of WLAN parameters associated with the radio coupling to the WLAN 102 based on execution of the second client WLAN stack 132 emulating the plurality of layers 401-405 of the first client WLAN stack 131 by: first determining (e.g. at the blocks 501, 503) whether one or more of network scan data 445 and network connectivity data (e.g. raw packets) indicate that a connection of the radio 118 to the WLAN 102 is occurring; when the connection of the radio 118 to the WLAN 102 is occurring: continue analyzing the predetermined set of WLAN parameters to determine a connectivity state of the radio 118; and when the connection of the radio to the WLAN 102 is not occurring: stop analyzing the predetermined set of WLAN parameters.

Further comparing the method 500 to the method 300, according to the blocks 509-513, 517, 519 occurring prior to the blocks 521, 523, the at least one processor 120 is configured to analyze predetermined set of WLAN parameters associated with the radio coupling to the WLAN 102 based on execution of the second client WLAN stack 132 emulating the plurality of layers 401-405 of the first client WLAN stack 131 by: determining that a connection between the radio 118 and the WLAN 102 is completed (e.g. after block 513 and/or after block 519); and, thereafter, determining one or more of link quality and network reachability (e.g. at blocks 521, 523).

Client devices and methods described herein can provide an all-in-one apparatus for accurate analysis of connectivity and reachability of a client device, and also for connectivity predictions, such that output from the analysis can be used not only for determining a connectivity state of a particular client device, but also can be used to forecast connectivity of other models and/or instances of the client device.

Such client devices and methods can hence provide captured data and recorded analysis/conclusions of the solution can interface/output onto multiple 'recipients' apparatuses which can be used by the professional community;

Such client devices and methods can further provide on-device application for real-time or playback display, for example by providing output from the analysis to an external device performing remote centralized cloud analytics, and the like, that can include a plugin in a back-end visualization of WLAN connectivity and which can process data from multiple client devices.

Output from the analysis can also be provided to a remote wireless-controller, and the like, which can combine the client device analysis with infrastructure analysis including, but not limited to, wireless LAN controllers (WLC) and APs.

Output from the analysis can also be provided to external servers and/or PC (personal computer) hosts with respective plugins for display and analytics.

Such output can further facilitate analysis of WLAN connectivity, and the like, by one or more of customer IT entities, support entities, field-engineers, $3^{rd}$-party deployments and professional-services entities (e.g. ECRT systems, engineers, etc.). Such output can further facilitate analysis of WLAN connectivity in customer debugging environments (onsite/offsite, customer labs, and the like), readiness-testing in production environments, monitoring/debugging environments (e.g. to monitor/debug particular WLAN problems, etc.).

The client devices and methods described herein can further simplify analysis of WLAN connectivity for non-professional facilitators and/or users, and hence can further save time and/or cost money. Indeed, in some embodiments, the methods described herein can occur on a one-time basis (e.g. upon initiating a connection with WLAN), occur upon receipt of input at an input device, and/or be pre-scheduled and/or occur periodically. In particular, the output from such methods can reduce a need for a WLAN expert (and/or engineer) being onsite and/or on-call to troubleshoot WLAN issues. Further, the output from such methods can reduce a need for immediate debugging/tooling capabilities.

The methods described herein can further can be triggered in a scheduled "automation" fashion, to capture/analyze WLAN connectivity, and the like, "under the hood" in client devices, not only performing analysis, but raising and/or transmitting "alerts" according to a severity of detected problems and/or sending notifications directly to an IT entity, and the like.

The client devices and methods described herein can further be used to detect failure scenarios that can include, but is not limited to: client device and/or configuration failures, WLAN connection failures, interoperability failures (e.g. between a client device and an AP), WLAN coverage issues, packet loss/drop, VOW (Voice over Internet Protocol) failures, roaming failures, battery drain, and the like.

The client devices and methods described herein can further be used for proactive correction of configuration at a client device. For example, when the methods described herein result in detection of a problem with the configuration data at a client device, the configuration data can be corrected.

The methods described herein can further be triggered in a scheduled automation fashion, such that the methods can capture and/or analyze "under the hood" in the devices described herein. In some embodiments, the methods described herein not only recording output but also raise "alerts" according to severities of detected problems, send notifications directly to an IT device, etc.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, language of "at least one of X, Y, and Z" and "one or more of X, Y and Z" can be construed as X only, Y only, Z only, or any combination of two or more items X, Y, and Z (e.g., XYZ, XY, YZ, XZ, and the like). Similar logic can be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A client device comprising:
   a memory;
   a radio coupled to at least one processor, the at least one processor configured to:
   execute, in the memory, a first client Wireless Local Area Network (WLAN) stack having a plurality of layers configured to couple the radio to a WLAN;
   emulate, using a second client WLAN stack the plurality of layers of the first client WLAN stack;
   receive, at the second client WLAN stack, data from the plurality of layers of the first client WLAN stack;
   analyze, by executing the second client WLAN stack, a predetermined set of WLAN parameters of the client device based on the received data; and
   reconfigure the first client WLAN stack based on the analysis of the predetermined set of WLAN parameters, wherein the at least one processor executes the first client WLAN stack in parallel with emulating the second client WLAN stack.

2. The client device of claim 1, wherein the processor is further configured to report an output of the predetermined set of WLAN parameters to an external device.

3. The client device of claim 1, wherein the predetermined set of WLAN parameters comprises one or more of: connectivity, link quality, and network reachability of the radio over the WLAN.

4. The client device of claim 1, wherein the data received from the first client WLAN stack comprises one or more of: unencrypted packets transmitted to the WLAN and received from the WLAN; event data associated with one or more of the plurality of layers; configuration data; and network scan data.

5. The client device of claim 1, wherein the at least one processor is further configured to: determine, based on execution of the second client WLAN stack, that execution of one or more processes of the first client WLAN stack is blocked, change configuration data associated with the first client WLAN stack to unblock the execution of the one or more processes, and re-execute the first client WLAN stack to execute the one or more processes based on changed configuration data.

6. The client device of claim 1, wherein the at least one processor is further configured to analyze the predetermined set of WLAN parameters associated with the radio coupling to the WLAN based on the received data by:
   first determining whether one or more of network scan data and network connectivity data indicate that a connection of the radio to the WLAN is occurring;
   when the connection of the radio to the WLAN is occurring: continue analyzing the predetermined set of WLAN parameters to determine a connectivity state of the radio; and
   when the connection of the radio to the WLAN is not occurring: stop analyzing the predetermined set of WLAN parameters.

7. The client device of claim 1, wherein the at least one processor is further configured to analyze the predetermined set of WLAN parameters associated with the radio coupling to the WLAN based on execution of the second client WLAN stack emulating the plurality of layers of the first client WLAN stack by:
   determining that a connection between the radio and the WLAN is completed; and, thereafter, determining one or more of link quality and network reachability.

8. The client device of claim 1, wherein the predetermined set of WLAN parameters includes one or more of link quality and network reachability, and the at least one processor is further configured to analyze one or more of the link quality and the network reachability by: controlling the radio to transmit one or more packets to determine one or more of the link quality and the network reachability.

9. A method at a client device comprising a memory and a radio coupled to at least one processor, the method comprising:
   executing, by the at least one processor, a first client Wireless Local Area Network (WLAN) stack having a plurality of layers configured to couple the radio to a WLAN;
   emulating, by the at least one processor, using a second client WLAN stack, the plurality of layers of the first client WLAN stack;
   receiving, by the at least one processor, at the second client WLAN stack, data from the plurality of layers of the first client WLAN stack;

analyzing, by the at least one processor, a predetermined set of WLAN parameters of the client device based on the data received from the plurality of layers of the first client WLAN stack; and operating the first client WLAN stack based on the analysis performed by the at least one processor, wherein the at least one processor executes the first client WLAN stack in parallel with emulating the second client WLAN stack.

10. The method of claim 9, further comprising reporting an output of the predetermined set of WLAN parameters to an external device.

11. The method of claim 9, wherein the predetermined set of WLAN parameters comprises one or more of: connectivity, link quality, and network reachability of the radio over the WLAN.

12. The method of claim 9, wherein the data received from the first client WLAN stack comprises one or more of:
unencrypted packets transmitted to the WLAN;
unencrypted packets received from the WLAN;
event data associated with one or more of the plurality of layers;
configuration data; and
network scan data.

13. The method of claim 9, further comprising:
determining, based on execution of the second client WLAN stack, that execution of one or more processes of the first client WLAN stack is blocked;
changing configuration data associated with the first client WLAN stack to unblock the execution of the one or more processes; and
re-executing the first client WLAN stack to execute the one or more processes based on changed configuration data.

14. The method of claim 9, further comprising analyzing the predetermined set of WLAN parameters of the client device based on the data received from the plurality of layers of the first client WLAN stack by:
first determining whether one or more of network scan data and network connectivity data indicate that a connection of the radio to the WLAN is occurring;
when the connection of the radio to the WLAN is occurring: continue analyzing the predetermined set of WLAN parameters to determine a connectivity state of the radio; and
when the connection of the radio to the WLAN is not occurring: stop analyzing the predetermined set of WLAN parameters.

15. The method of claim 9, further comprising analyzing the predetermined set of WLAN parameters of the client device based on the data received from the plurality of layers of the first client WLAN stack by: determining that a connection between the radio and the WLAN is completed; and, thereafter, determining one or more of link quality and network reachability.

16. The method of claim 9, wherein the predetermined set of WLAN parameters includes one or more of link quality and network reachability, and the method further comprises analyzing one or more of the link quality and the network reachability by: controlling the radio to transmit one or more packets to determine one or more of the link quality and the network reachability.

17. A non-transitory computer-readable medium of a client device having a radio coupled to at least one processor, the non-transitory computer-readable medium having stored thereon computer executable instructions, the instructions comprising:
executing a first client Wireless Local Area Network (WLAN) stack having a plurality of layers configured to couple the radio to a WLAN;
emulating, using a second client WLAN stack, the plurality of layers of the first client WLAN stack;
receiving, at the second client WLAN stack, data from the plurality of layers of the first client WLAN stack;
analyzing a predetermined set of WLAN parameters of the client device based on the data received from the plurality of layers of the first client WLAN stack; and
operating the first client WLAN stack based on the analysis performed by the second client WLAN stack, wherein the first client WLAN stack is executed in parallel with emulating the second client WLAN stack.

18. The non-transitory computer-readable medium of claim 17, wherein the instructions further include reporting an output of the predetermined set of WLAN parameters to an external device.

19. The non-transitory computer-readable medium of claim 17, wherein the instructions further include:
determining, based on execution of the second client WLAN stack, that execution of one or more processes of the first client WLAN stack is blocked;
changing configuration data associated with the first client WLAN stack to unblock the execution of the one or more processes; and
re-executing the first client WLAN stack to execute the one or more processes based on changed configuration data.

20. The non-transitory computer-readable medium of claim 17, wherein the instructions further include analyzing the predetermined set of WLAN parameters of the client device based on the data received from the plurality of layers of the first client WLAN stack by:
first determining whether one or more of network scan data and network connectivity data indicate that a connection of the radio to the WLAN is occurring;
when the connection of the radio to the WLAN is occurring: continue analyzing the predetermined set of WLAN parameters to determine a connectivity state of the radio; and
when the connection of the radio to the WLAN is not occurring: stop analyzing the predetermined set of WLAN parameters.

* * * * *